US011713795B2

(12) United States Patent
Rahmatalla et al.

(10) Patent No.: US 11,713,795 B2
(45) Date of Patent: Aug. 1, 2023

(54) VIBRATION DAMPENING SYSTEM

(71) Applicants: ActiBioMotion, LLC, Coralville, IA (US); University of Iowa Research Foundation, Iowa City, IA (US)

(72) Inventors: Salam Rahmatalla, Coralville, IA (US); Eric C. Frick, Coralville, IA (US); Charles W. Harris, Jr., Coralville, IA (US); Varun Chalasani, Coralville, IA (US)

(73) Assignees: ActiBioMotion, LLC, Coralville, IA (US); University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 17/333,464

(22) Filed: May 28, 2021

(65) Prior Publication Data

US 2021/0372502 A1 Dec. 2, 2021

Related U.S. Application Data

(60) Provisional application No. 63/031,758, filed on May 29, 2020.

(51) Int. Cl.
 *F16F 15/18* (2006.01)
(52) U.S. Cl.
 CPC .......... *F16F 15/18* (2013.01); *F16F 2222/06* (2013.01)
(58) Field of Classification Search
 CPC .... F16F 15/18; F16F 2222/06; F16F 2232/06; F16F 7/1022
 See application file for complete search history.

(56) References Cited

U.S. PATENT DOCUMENTS

| 2,495,920 A |   | 1/1950 | Dentler |
|---|---|---|---|
| 2,703,156 A |   | 3/1955 | Jules |
| 3,145,012 A |   | 8/1964 | Kfoury |
| 4,286,693 A | * | 9/1981 | Sulzer .................. F16F 7/1022 368/125 |
| 4,596,373 A |   | 6/1986 | Omi et al. |

(Continued)

FOREIGN PATENT DOCUMENTS

| CN | 108582494 A | * | 9/2018 | ............... B28C 5/48 |
|---|---|---|---|---|
| DE | 102018117796 A1 | | 1/2020 | |

(Continued)

OTHER PUBLICATIONS

EPO Translation of the Description of CN 108582494 A, Shi, Sep. 28, 2018. (Year: 2022).*

(Continued)

*Primary Examiner* — Daniel D Yabut
(74) *Attorney, Agent, or Firm* — Simmons Perrine Moyer Bergman PLC

(57) ABSTRACT

The invention includes systems having a cover attached to a frame, and a transmission unit with a rotational device connected to or part of the frame. The cover is mechanically connected to the at least one rotational device. A vibration dampening unit mechanically connected to the transmission unit such that translational movement (e.g. vertical movements) of the cover causes rotational movement of the rotational device. The rotational movement is, in turn, transmitted to the vibration dampening unit via the transmission unit. Preferably, the vibration dampening unit is a passive unit and also a resistance force modulated vibration dampening unit. The invention also includes methods for dampening vibrations on a load which includes converting translational movement of a load to rotational movement in a transmission unit, the transmission magnifies the displacement and speed of the rotational movement, and then transmitting the rotational movement to a vibration dampening unit, which dissipated the vibrational energy.

19 Claims, 2 Drawing Sheets

(56) References Cited

U.S. PATENT DOCUMENTS

| | | | |
|---|---|---|---|
| 6,416,127 | B1 | 7/2002 | Galbreath, Jr. et al. |
| 8,220,598 | B2 | 7/2012 | Valembois |
| 8,739,942 | B2 | 6/2014 | Lafitte et al. |
| 9,021,751 | B2 | 5/2015 | Yakoub |
| 10,590,994 | B2 | 3/2020 | Antchak et al. |
| 2003/0196501 | A1* | 10/2003 | Doornbos ............... F16F 7/00 74/411 |
| 2007/0278025 | A1* | 12/2007 | Shoemaker ........... B60N 2/501 180/89.13 |
| 2011/0220443 | A1* | 9/2011 | Ivanco ..................... F16F 9/12 188/380 |
| 2017/0023109 | A1* | 1/2017 | Ellison ................... F16H 13/02 |
| 2017/0037668 | A1* | 2/2017 | Kruedener ............ A47B 96/00 |
| 2020/0263759 | A1* | 8/2020 | Imanishi ................ F16F 6/005 |

FOREIGN PATENT DOCUMENTS

| | | | | |
|---|---|---|---|---|
| EP | | 2551167 A3 | 9/2013 | |
| JP | | H06016746 U | 3/1994 | |
| JP | | 2000074135 A | * 3/2000 | |
| JP | | 2000074135 A | 3/2000 | |
| JP | | 2005009565 A | 1/2005 | |
| JP | | 2012207646 A | 10/2012 | |
| KR | | 2009006937 A | * 1/2009 | ............. B60N 2/502 |

OTHER PUBLICATIONS

EPO Translation of the Description of KR 20090006937 A, Byeon, Jan. 16, 2009. (Year: 2022).*

Andrex Friction Shock Absorbers—FS-125—MGAguru—dated Jun. 2, 2020.

Parameter Optimization of a Vertical Spring-Viscous Damper-Coulomb Friction System Biao Wei—dated Apr. 14, 2019 Found At: https://www.hindawi.com/journals/sv/2019/5764946/.

PCT International Search Report & Written Opinion dated Jan. 3, 2022.

* cited by examiner

US 11,713,795 B2

VIBRATION DAMPENING SYSTEM

CLAIM OF PRIORITY

This application claims the benefit of U.S. Provisional Patent application 63/031,758, filed on May 29, 2020, which is incorporated by reference.

GOVERNMENTAL SUPPORT

This invention was made with government support under Award No. 1819917, awarded by National Science Foundation. The government has certain rights in the invention.

FIELD OF THE INVENTION

This invention relates to systems and methods for vibration dampening of loads, and more particularly, to passive vibration dampening of loads.

BACKGROUND OF THE INVENTION

Vehicles used worldwide expose human operators and occupants to harmful vibrations, including jarring and shocks, that have long-term potential for injuries and loss of productivity. Continual exposure to low-frequency whole-body vibration and repeated shocks can cause discomfort, reduction in work performance, and chronic low-back pain for seated humans, especially for operators of heavy machinery and other large vehicles. Manufacturers and owners of heavy vehicles used in the massive national and international industries of aviation, trucking, busing, agriculture, construction, boating, and mining, as well as the military, should be very interested in reducing musculoskeletal health issues and increasing operator productivity and performance.

Traditionally, seats have been passive and do not require external power. However, known passive seats are not particularly effective in reducing the harmful vibration transmitted to the operator in the low frequency range. Known solutions for vibration dampening include active and semi-active seats that utilize an external power source to provide more-effective vibration mitigation. But the external power requirement for the vibration dampening system unacceptably increases the complexity and cost of such seats.

More generally, dampening of vibrational energy is desirable for any type of load that is carried in or on a platform or vehicle.

SUMMARY OF THE INVENTION

The invention includes systems having a cover attached to a frame, and a transmission unit with a rotational device connected to or part of the frame. The cover is mechanically connected to the at least one rotational device. A vibration dampening unit mechanically connected to the transmission unit such that translational movement (e.g. vertical movements) of the cover causes rotational movement of the rotational device. The rotational movement is, in turn, transmitted to the vibration dampening unit via the transmission unit. Preferably, the vibration dampening unit is a passive unit and also a resistance force modulated vibration dampening unit. The invention also includes methods for dampening vibrations on a load which includes converting translational movement of a load to rotational movement in a transmission unit, and then transmitting the rotational movement to a vibration dampening unit, which dissipates the vibrational energy.

DETAILED DESCRIPTION OF THE INVENTION

Figure 1:
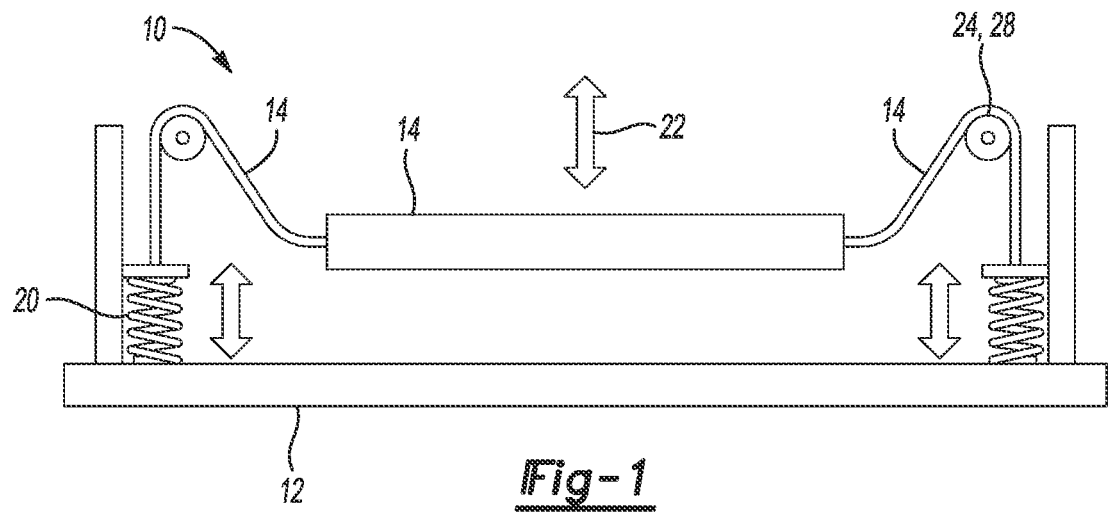
FIG. 1 shows front view of a vibration dampening system.
Figure 2:
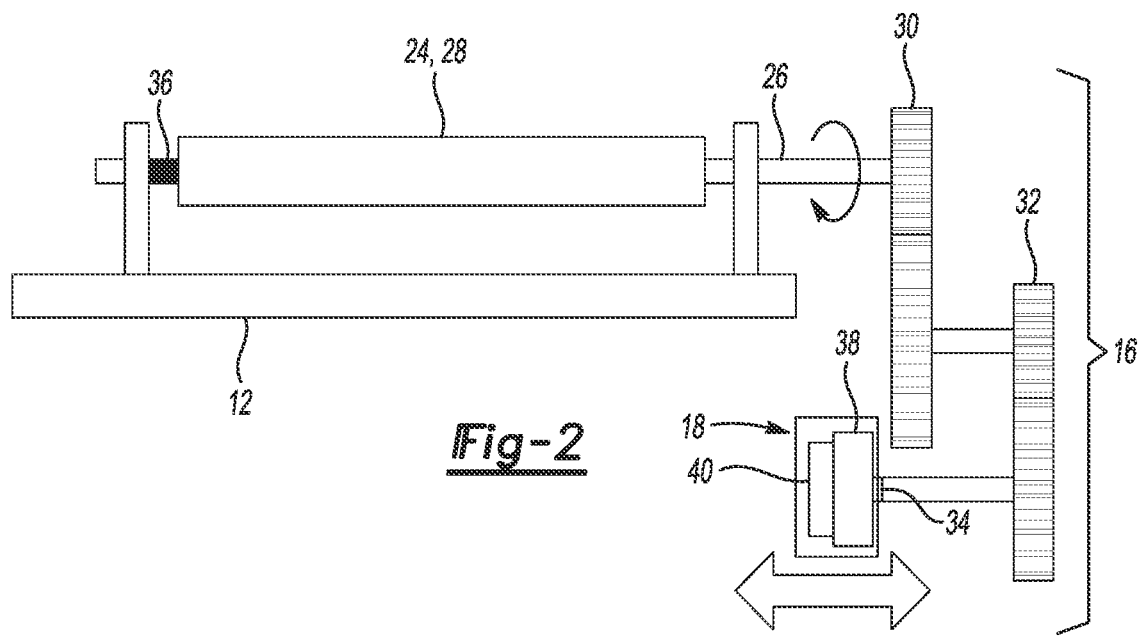
FIG. 2 shows a side view of a vibration dampening system.

The invention includes a system and components, and methods, related to vibration dampening; that is, dissipation of vibrational energy. The system 10, as seen in FIGS. 1 and 2, is used to separate a load from a platform. While discussed in the context of the specific example of seats for humans, it is contemplated that this invention could be used to dissipate vibrational energy for an unlimited number of types of loads and platforms, and in a wide variety of situations. Exemplary types of loads include animate or inanimate objects. Exemplary types of platforms include land, water, amphibious, and space vehicles, as well as trailers, railcars, shipping containers, and pallets.

The system 10 comprises a frame 12, a cover 14, a transmission unit 16, and a vibration dampening unit 18. The frame 12 serves to support the other components of the system and to anchor the system to the platform for carrying the load. Typically made of metal, wood, plastics, composites, or combinations thereof, the frame is sized and shaped in accordance with the size, shape, weight, vibration tolerances of the load. Typically, the frame includes a circumferential edge at or near the top of the frame; that is, relatively closer to load rather than the platform to which the frame is attached.

The cover 14 is attached to some or all of the circumferential edge of the frame in a flexible manner. The purpose of the cover is to support the load when it is placed on the system by suspending the load apart from the frame or platform. Together the cover and frame provide physical separation of the load from the platform. For example, the cover is where the vehicle operator places their posterior during operation of the vehicle.

In one embodiment, the cover comprises a fabric, film, or foam that is flexible, such as a woven fabric, a non-woven fabric, netting, foam layer, single or multilayered films, or a combination of these. The cover preferably has a low stretch characteristic such that it stretches less than about 10% percentage when under load, however a cover with any stretch characteristic is contemplated.

In one embodiment, the cover is substantially all flexible material (e.g. fabric or film). Here, the cover tends to conform to the shape of the load, e.g. a human posterior. In another embodiment, the cover also comprises a rigid or stiff portion and a flexible film portion, which flexible portion is, in turn, connected to the frame. In this embodiment, the load may be placed on the rigid portion. This would provide support to the load where it is disadvantageous to have the cover conform its shape to the load; for example, when the load is a box or crate.

Optionally, a tensioning unit 20 is utilized in conjunction with the cover. When used, the tensioning unit connects the cover to the frame or platform and supplies tension to the cover. This assists in returning the cover to its starting position when the load is removed from the cover. Also, the tensioning unit may be adjustable such that the tension on the cover can be adjusted, either before or after a load is placed on the cover. This helps insure contact of the cover to the frame or the transmission unit. A variety of knobs (e.g. rheostatic knobs) and/or stitches (e.g. electronically, mechanically, or any form of controlled tensioning units) can be used by the operator to adjust the cover tension to the operator's preference or to the requirements of the load.

The transmission unit 16 accomplishes three functions. First, it converts translational movement (e.g. vertical) into rotational movement. Thus, when the load moves up and down (as depicted by arrow 22), the cover causes the transmission to move. This up and down movement results from vibrational energy being transmitted through the platform, frame, cover, or load. Second, the transmission magnifies the displacement and speed of the rotational movement. And third, the transmission unit transmits the rotational movement to the vibration dampening unit. Of course, because of inertia of the components, and friction between the components of the transmission unit, some amount of vibrational energy is dissipated through operation of the transmission unit.

The transmission unit 16 connects the cover 14 to the vibration dampening unit 18. The transmission unit includes at least one rotational device 24 and a linkage 26, where the linkage connects the rotational device to vibration dampening unit.

In one embodiment, the at least one rotational device includes at least one roller 28, where the cover is mechanically connected to the at least one roller, either through direct contact between the cover and roller or indirectly through any of various mechanical linkages (including shafts, gears, belts, pulleys, joints, decoupling devices, and the like). In either situation, the cover transmits movement of the load to the roller. In particular, when the load moves up and down (e.g. bounces), as found when the platform vibrates, the at least one roller rotates. In effect, the translational vertical movement of the load pulls on the roller and is converted to rotational movement of the at least one roller. Stated alternatively, the up-down translational energy of the load is converted to rotational energy of the at least one roller.

In another embodiment, the rotational device includes at least one rack and pinion system where the cover is mechanically connected to the rack, either through direct contact between the cover and rack or indirectly through any of various mechanical linkages (including shafts, gears, belts, pulleys, joints, decoupling devices, and the like). In either situation, the cover transmits movement of the load to the rack, which turns the pinion. That is, when the load moves up and down (e.g. bounces), as found when the platform vibrates, the at least one pinion rotates.

The linkage preferably includes one or more gears 30, 32 to transmit the rotational movement of the rotational device to the vibration dampening unit 18. In one embodiment, a pair of different sized gears are used. In this manner, the rotational motion generated by load can be amplified. That is, use of a larger driving gear increases the angular speed of the smaller driven gear, and thus increases the transmission of rotational movement to the vibration dampening device. In this embodiment, preferably the larger gear 30 is linked to the rotational device and the smaller gear 32 is linked to the vibration dampening unit. Various additional linkages may be used as part of the transmission unit to connect the components of the transmission unit to each other or to the vibration dampening unit.

One preferred additional component used to connect the transmission unit to the vibration dampening unit is a decoupling device 34. The decoupling device permits rotation only in one direction (e.g. clockwise). The effect of the decoupling device is that the transmission unit only rotates the input (discussed below) of the vibration dampening unit during a portion of the vertical translational movement of the load or cover. For example, the downward translational movement of the load is transmitted, as rotational movement, through the transmission unit, but the upward translational movement of the load does not cause counter-rotational movement to be transmitted to the vibration dampening unit. The decoupling device thus helps to isolate or decouple the operation of the cover and transmission unit from the vibration dampening unit. This allows the vibration dampening unit to dissipate vibrational energy independently of the transmission unit. Here, the vibration dampening unit can continue to dissipate vibrational energy even after the transmission unit has ceased transferring movement to the vibration dampening unit. The decoupling device also minimizes or eliminates any interference by the vibration dampening unit with the operation of the transmission unit and cover. This isolation or decoupling also minimizes or eliminates any transmittance of vibrational energy back from the vibration dampening unit and through the transmission unit.

Any type of device may be used as the decoupling device, provided they accomplish the functionality of only allowing rotation in one direction (e.g. clockwise). For example, one-way bearings, ratchets, clutches, magnetic induction devices, friction devices (where the co-efficient of friction differs depending on the direction of rotation), etc. may be used as decoupling devices. Although passive decoupling devices are preferred, active or semi-active device decoupling devices may also be utilized. While preferably used in at least the location where the transmission unit connects to the vibration dampening unit, the decoupling device may be used elsewhere in the transmission unit. Using a plurality of decoupling units is also contemplated.

The transmission unit may also include a spring 36 (e.g. a torsional spring) or other device to counteract the rotational movement of the rotational device or the gears in the transmission unit. The spring acts on the rotational device or gear to return the rotational device to a starting or reset position so that the rotational device is again able to transmit vertical translational movement to the transmission unit and the vibration dampening unit. In particular, when the load moves down, the rotational device rotates. When the load moves up, the spring provides a counteracting force to counter-rotate the rotational device, and thus resetting the rotational device. The spring accomplishes the same function as the tensioning unit; i.e. assisting in returning the cover to its starting position when the load is removed from the cover or providing tensioning to the cover. The use of the decoupling unit in combination with the spring facilitates this counter-rotation because the spring is not attempting to counter-rotate the input (discussed below) of the vibration dampening unit.

The vibration dampening 18 unit functions to dissipate the movement transmitted from the cover through the transmission unit. In one embodiment, a frictional dampening unit uses friction, through direct contact of adjacent plates, to dissipate the vibrational energy. That is vibrational energy is dissipated as heat through friction. In a second embodiment, a fluidic dampening unit uses liquids or gases to dissipate the vibrational energy. That is, vibrational energy is dissipated as heat generated through the viscous shearing of a gas or liquid. In a third embodiment, a magnetic dampening unit uses opposing magnetic fields to dissipate the vibrational energy. That is, vibrational energy is dissipated, for example, by eddy current dampening as magnets move through opposing magnetic fields.

Each embodiment of the vibration dampening unit preferably achieves the same functional characteristics in that there a correlation between the size of the vertical translation movement and the resistance provided by the vibration dampening unit. This correlation may be linear or non-linear. The non-linear correlation typically means that resistance force increases faster than linearly. This non-linear correlation is called resistance force modulation, and is preferred. Meaning that for small vertical movements, the resistance forces will be small (e.g. a small coefficient of friction). And that for larger vertical movements, the resistance forces will be larger. For a frictional dampening unit, small vertical movements will result is a small coefficient of friction and larger vertical movements will result in a higher coefficient of friction between the input and dissipation unit (as discussed below). For a fluidic vibration dampening unit, a non-Newtonian fluid would provide a non-linear correlation between the vertical translation movement and the resistance provided by the vibration dampening unit. Similar non-linear correlation between the vertical translation movement and the resistance provided by the magnetic vibration dampening unit. Resistance force modulated vibration dampening units permit the system to dissipate vibrational energy over a wide range of vertical movements of the load.

Each dampening unit comprises an input 38, mechanically connected to the transmission unit, and a dissipation unit 40. The input and dissipation unit work cooperatively to dissipate the vibrational energy.

The input for the frictional dampening unit may include at least one friction surface that has a surface that will rub against a surface of the dissipation unit. In a preferred embodiment, the friction surface is a first circular plate and the dissipation unit includes one or more second friction surface that are also circular plates. The rotational movement transmitted through the transmission unit rotates the first friction plate and it rubs against the second friction plate. For example, the first friction plate attached to a shaft connected to the smaller gear in the transmission unit. In this way, the frictional dampening unit dissipates the vibrational energy from the load. Any pair of complementary friction surfaces may be used.

Each of the friction surfaces may have a uniform roughness or the roughness may vary across the surface. In one embodiment, the roughness of the friction surface changes as the radial distance increases. For example, the coefficient of friction for the surface could increase (or decrease) as the distance from the center (axis of rotational) of the surfaces increases; that is, as the radial distance increases. In the alternative, the roughness may fluctuate as the radial distance increases. Friction surfaces may be of consistent roughness or patterns of varying roughness on their surfaces. In one embodiment, the dissipation unit may comprise a plurality of friction surfaces (e.g. multiple plates) with multiple surfaces (e.g. front and back of the plate) that have the same or different roughness.

Figure 3:
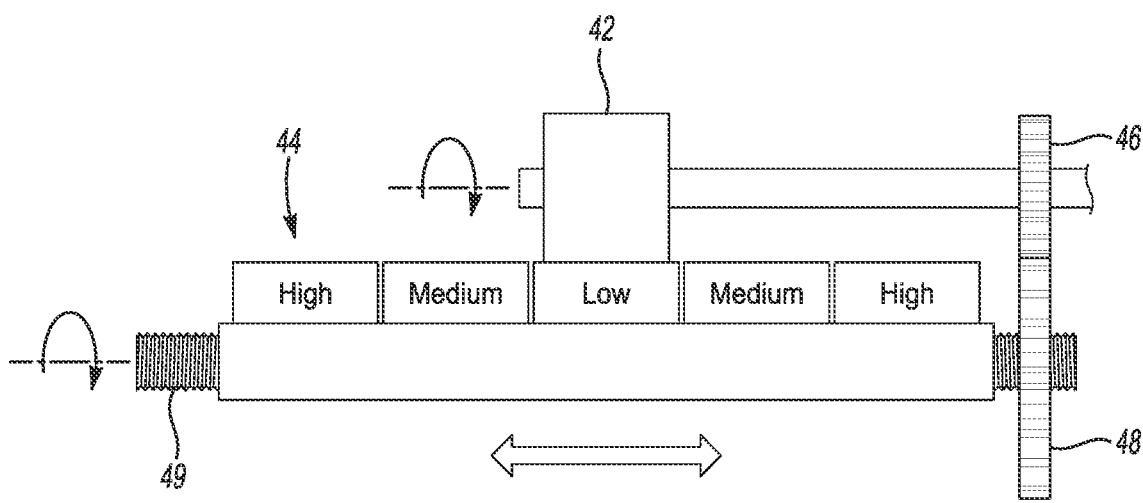
FIG. 3 shows a view of a frictional dampening unit.

In the frictional dampening unit, the resistance force modulation is achieved by allowing a first friction plate 42 to rub on a second friction plate 44 such that the first friction plate will slide radially from the center of the second friction plate toward its edge as the vertical translation movement of the load increases. This may be accomplished by moving the second friction plate and holding the first friction plate steady, or vice versa. In FIG. 3, the variability of the coefficient of friction on the second friction plate is denoted by the words low, medium, and high. The slide of the friction plates is accomplished with a pair of gears 46, 48 and a carriage screw 49 for the second friction plate, which moves the second friction plate along an axis of rotation of gear 48, that is, axially. Resistance force modulation can also be achieved by applying external pressure to two adjacent friction plates to cause a higher coefficient of friction between the plates, where the applied external pressure is proportional to the vertical translation movement.

Figure 4:
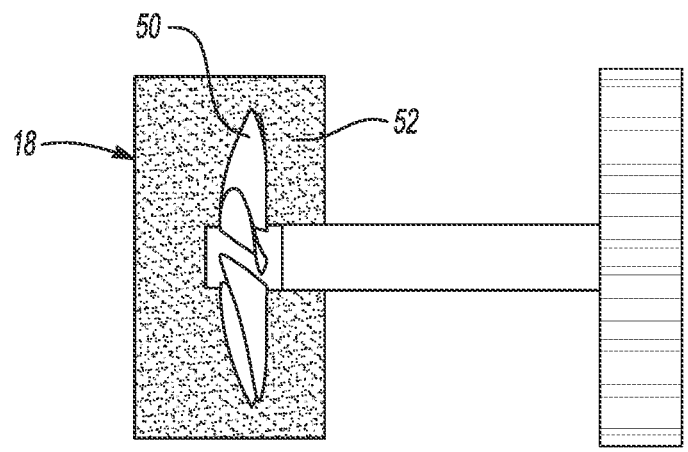
FIG. 4 shows a view of a fluidic dampening unit.

In another embodiment of the vibration dampening unit, the fluidic dampening unit utilizes fluids, including liquids, gases, and combinations as part of the dissipation of vibration energy. Here, as seen in FIG. 4, the input for the fluidic dampening unit comprising a propeller 50 or other 3D shape, while dissipation unit comprises a reservoir 52 for a fluid. The fluid in the reservoir resists the motion of the input, thus dissipating the vibrational energy, with fluids having a higher viscosity providing more resistance. A variety of shapes, types, number of propellers may be utilized for the input. Similarly, the fluid in the reservoir may be selected based on viscosity or other characteristic (e.g. environmental compatibility or inertness). The resistance provided by the fluid may be static or adjustable, so as to temporarily or permanently change the vibrational energy dissipation characteristics of the fluidic dampening unit.

Figure 5:
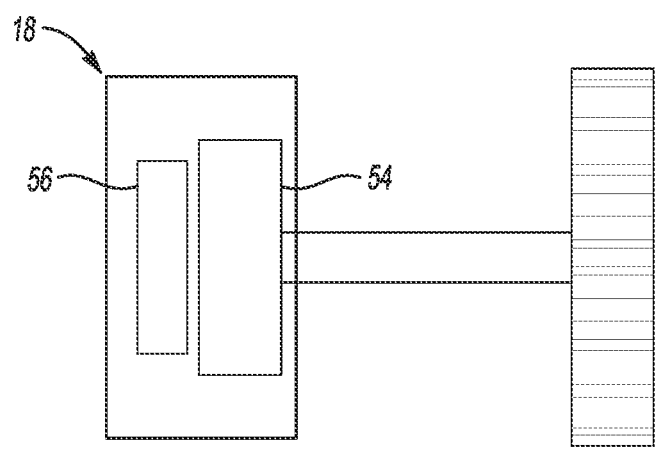
FIG. 5 shows a view of a magnetic dampening unit.

In yet another embodiment, the magnetic dampening unit utilizes one or more magnetic fields as part of the dissipation of vibration energy. Here physical contact (either between friction plates or between a fluid and its container) is not required. In this embodiment, the input has a first magnetic field, however created, and the dissipation unit has a second, opposing magnet field, however created. As seen in FIG. 5, the input may include a first magnet 54 and the dissipation unit may include a second magnet 56. The rotational movement transmitted through the transmission unit rotates the first magnetic field and this is resisted by the second magnetic field. The movement of the magnet fields dissipates the vibrational energy. One such phenomenon is eddy current dampening. The strength of the one or more magnetic fields may be static or adjustable, so as to temporarily or permanently change the vibrational energy dissipation characteristics of the magnetic dampening unit.

Preferably, the vibration dampening unit is passive in that it does not utilize an external power source to provide the vibration dampening or energy dissipation. Although vibration dampening units with external power sources are contemplated, the absence of such external power source reduces the complexity of the system. Further, external power sources, when utilized, may not provide vibration dampening directly, but rather may adjust the vibration dampening characteristics of the vibration dampening unit. For example, in a frictional dampening unit an external power source may be used to increase the pressure between adjacent frictional plates. Or in the fluidic dampening unit, the external power source may be used to increase the pressure on the fluid in the reservoir, thus increasing the energy dissipation of the unit. Or in the magnetic dampening unit, the external power source may be used to increase the strength of the magnetic fields, thus increasing the energy dissipation of the unit. Moreover, external power sources may be utilized to adjust other components of the system such as the tensioning unit or the spring of the transmission unite.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

REFERENCE NUMERALS

10 System
12 Frame
14 Cover
16 Transmission unit
18 Vibration dampening unit
20 Tensioning unit
22 Arrow
24 At least one rotational device
26 Linkage
28 Roller
30 Large gear
32 Small gear
34 Decoupling device
36 Spring
38 Input
40 Dissipation unit
42 First friction plate
44 Second Friction plate
46 Gear
48 Gear
49 Carriage screw
50 Propeller
52 Reservoir
54 First magnet
56 Second magnet

We claim:

1. A system comprising:
a seat cover that is at least partially flexible and attached to a frame;
a transmission unit comprising at least one rotational device connected to or part of the frame, wherein the seat cover contacts a surface of the at least one rotational device; and
a vibration dampening unit mechanically connected to the transmission unit,
wherein translational movement of the seat cover causes rotational movement of the at least one rotational device, which rotational movement is, in turn, transmitted to the vibration dampening unit via the transmission unit,
wherein the vibrational dampening unit comprises a friction plate with a variable coefficient of friction.

2. The system of claim 1 wherein a decoupling device connects the transmission unit to the vibration dampening unit.

3. The system of claim 1 wherein the at least one rotational device comprises at least one roller in contact with the seat cover.

4. The system of claim 3 wherein the seat cover contacts a circumferential surface of the at least one roller.

5. The system of claim 1 wherein the transmission unit comprises at least a first gear and a second gear, wherein the diameter of the first gear is larger than the diameter of the second gear, and wherein the first gear is linked to the at least one rotational device and the second gear is linked to the vibration dampening unit.

6. The system of claim 1, wherein the seat cover also comprises a rigid or stiff portion.

7. The system of claim 1, further comprising a tensioning unit.

8. The system of claim 1, wherein the transmission unit comprises at least two rotational devices.

9. The system of claim 1, wherein the seat cover comprises a fabric, film, or foam.

10. A method of dampening vibrations on a load, comprising:
converting translational movement of a load, supported by an at least partially flexible seat cover attached to a frame, to rotational movement in a transmission unit, the transmission comprising at least one rotational device and wherein the seat cover contacts a surface of at least one rotational device,
transmitting the rotational movement of the transmission unit to a vibration dampening unit,
dissipating vibrational energy in the vibration dampening unit utilizing a variable coefficient of friction.

11. The method of claim 10 wherein the transmitting step amplifies the rotational movement.

12. The method of claim 11 wherein the transmission unit is connected to the vibration dampening unit via a decoupling device.

13. The method of claim 10 wherein the seat cover directly contacts the surface of the at least one rotational device of the transmission unit.

14. The method of claim 10, wherein the seat cover also comprises a rigid or stiff portion.

15. The method of claim 10, further comprising adjusting a tension on the seat cover, either before or after the load is supported by the seat cover.

16. The method of claim 10, wherein the transmission unit comprises at least two rotational devices.

17. A system comprising:
- a seat cover that comprises a flexible portion and the seat cover is attached to a frame;
- a transmission unit comprising at least one roller connected to or part of the frame, wherein the flexible portion of the cover contacts the surface of the at least one roller; and
- a vibration dampening unit mechanically connected to the transmission unit,
- wherein translational movement of the cover causes rotational movement of the at least one roller because of contact with the flexible portion of the cover, which rotational movement is, in turn, transmitted to the vibration dampening unit via the transmission unit, and
- wherein the vibration dampening unit is a frictional dampening unit with a variable coefficient of friction.

18. The system of claim 17, wherein the cover comprises a fabric, film, or foam.

19. The system of claim 17 wherein the flexible portion of the cover directly contacts the surface of the at least one roller.

\* \* \* \* \*